(12) United States Patent
Jobs et al.

(10) Patent No.: US 7,650,137 B2
(45) Date of Patent: Jan. 19, 2010

(54) ACCOUNT INFORMATION DISPLAY FOR PORTABLE COMMUNICATION DEVICE

(75) Inventors: Steven P. Jobs, Palo Alto, CA (US); Freddy Allen Anzures, San Francisco, CA (US); Bas Ording, San Francisco, CA (US); Imran Chaudhri, San Francisco, CA (US); Scott Forstall, Mountain View, CA (US); Greg Christie, San Jose, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 11/322,552

(22) Filed: Dec. 23, 2005

(65) Prior Publication Data

US 2007/0149252 A1    Jun. 28, 2007

(51) Int. Cl.
*H04M 11/00* (2006.01)

(52) U.S. Cl. .................. 455/405; 455/406; 455/407; 455/408; 455/566

(58) Field of Classification Search ......... 455/405–409, 455/566; 379/114.2, 114.23, 114.22, 114.16, 379/114.17
See application file for complete search history.

(56) References Cited

U.S. PATENT DOCUMENTS

| | | | | |
|---|---|---|---|---|
| 1,699,104 A * | 1/1929 | Fonseca | ...................... | 374/134 |
| 2,168,817 A * | 8/1939 | Pflasterer | ...................... | 246/50 |
| 5,459,556 A * | 10/1995 | Acquaviva et al. | ............ | 399/58 |
| 6,211,858 B1 | 4/2001 | Moon et al. | .................. | 345/146 |
| 6,323,846 B1 | 11/2001 | Westerman et al. | ......... | 345/173 |
| 6,453,731 B1 * | 9/2002 | Yaegashi | .................. | 73/114.52 |
| 6,493,547 B1 * | 12/2002 | Raith | ......................... | 455/405 |
| 6,577,717 B1 * | 6/2003 | Henon | .................... | 379/114.01 |
| 2002/0151293 A1 | 10/2002 | Tysor | ......................... | 455/406 |
| 2002/0193093 A1 * | 12/2002 | Henrikson et al. | .......... | 455/405 |
| 2003/0045266 A1 * | 3/2003 | Staskal et al. | ............... | 455/405 |
| 2003/0078031 A1 * | 4/2003 | Masuda | ...................... | 455/406 |
| 2004/0023636 A1 * | 2/2004 | Gurel | .......................... | 455/405 |
| 2004/0085351 A1 | 5/2004 | Tokkonen | .................... | 345/741 |

(Continued)

FOREIGN PATENT DOCUMENTS

EP    1528781 A1    5/2005
WO    WO 00/70860    11/2000

OTHER PUBLICATIONS

Alltel, "My Account," http://attel.com/personal/cs/my_account.html, Dec. 1, 2005.

(Continued)

*Primary Examiner*—Vincent P Harper
*Assistant Examiner*—Dung Lam
(74) *Attorney, Agent, or Firm*—Morgan, Lewis & Bockius LLP

(57) ABSTRACT

A portable communication device includes a display and a processor coupled to the display. The processor is configured to automatically and repeatedly present an updated account usage metric for an account associated with usage of the portable communication device. In some embodiments, the presented account usage metric is an account balance associated with usage of the portable communication device, and the processor automatically and repeatedly presents an updated account balance on the display.

28 Claims, 5 Drawing Sheets

U.S. PATENT DOCUMENTS

2004/0106422 A1    6/2004  Ericsson ..................... 455/514
2004/0209595 A1*  10/2004  Bekanich ................... 455/405
2005/0032505 A1*   2/2005  Himelhoch ................ 455/405
2005/0079896 A1    4/2005  Kokko et al. ............... 455/566

OTHER PUBLICATIONS

International Search Report for International Application No. PCT/US2006/061346, mailed Apr. 2, 2007.

\* cited by examiner

ACCOUNT INFORMATION DISPLAY FOR PORTABLE COMMUNICATION DEVICE

TECHNICAL FIELD

The disclosed embodiments relate to user interfaces for portable communication devices.

BACKGROUND

Users of portable communication devices (e.g., mobile telephones, handhelds, media players, personal digital assistants (PDAs), BlackBerry™, pocket PCs, Smart Phones, etc.) typically enter into service contracts with service providers for voice and/or data services. The services are often organized into service plans that can be subscribed to by the user. Service plans can provide data services, voice services or a combination of voice and data services often referred to as "bundled" services. The service plans typically allocate limited amounts of minutes, bandwidth or storage based on the price of the plan. A voice service plan, for example, may charge a flat monthly fee for 400 "anytime" minutes and 200 night and weekend minutes. If the user exceeds these limits during the month they incur additional charges for each additional resource unit consumed, typically at a higher rate (e.g., $0.45/min) than the average rate (e.g., $0.15/min) for budgeted resource units. A data service plan, for example, may have a flat monthly fee for a certain amount of data storage capacity (e.g., 100 MB) for email and other data, as well as a surcharge rate (e.g., $0.01/MB) if the user consumes additional capacity during the month.

At present, users do not have a convenient way to review the current account balance(s) of service plans. If a user wants to know an account balance they must log into their account(s) on a Web page, call customer service, or send a special command via their mobile telephone. Thus, there is a need for improved access to user account balance and other account usage information.

SUMMARY OF EMBODIMENTS

In some embodiments, a portable communication device includes a display and a processor coupled to the display. The processor is configured to automatically and repeatedly present an updated account usage metric for an account associated with usage of the portable communication device. In some embodiments, the presented account usage metric is an account balance associated with usage of the portable communication device, and the processor automatically and repeatedly presents an updated account balance on the display.

In some embodiments, a method of displaying an account balance on a portable communication device comprises: downloading account information from a service provider in response to detection of a trigger condition; updating a graphical object based on the account information; and displaying the updated graphical object on the portable communication device.

In some embodiments, a computer-readable medium includes instructions, which, when executed by a processor in a portable communication system, causes the processor to perform the operations of: downloading account information from a service provider in response to detection of a trigger condition; updating a graphical object based on the account information; and displaying the updated graphical object on the portable communication device.

In some embodiments, a graphical user interface on a portable communication device includes a graphical object that automatically and repeatedly displays an updated account usage metric associated with usage of the portable communication device.

Thus, the present invention provides improved devices, methods, and user interfaces for accessing account usage data.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Overview of User Interface

Figure 1:
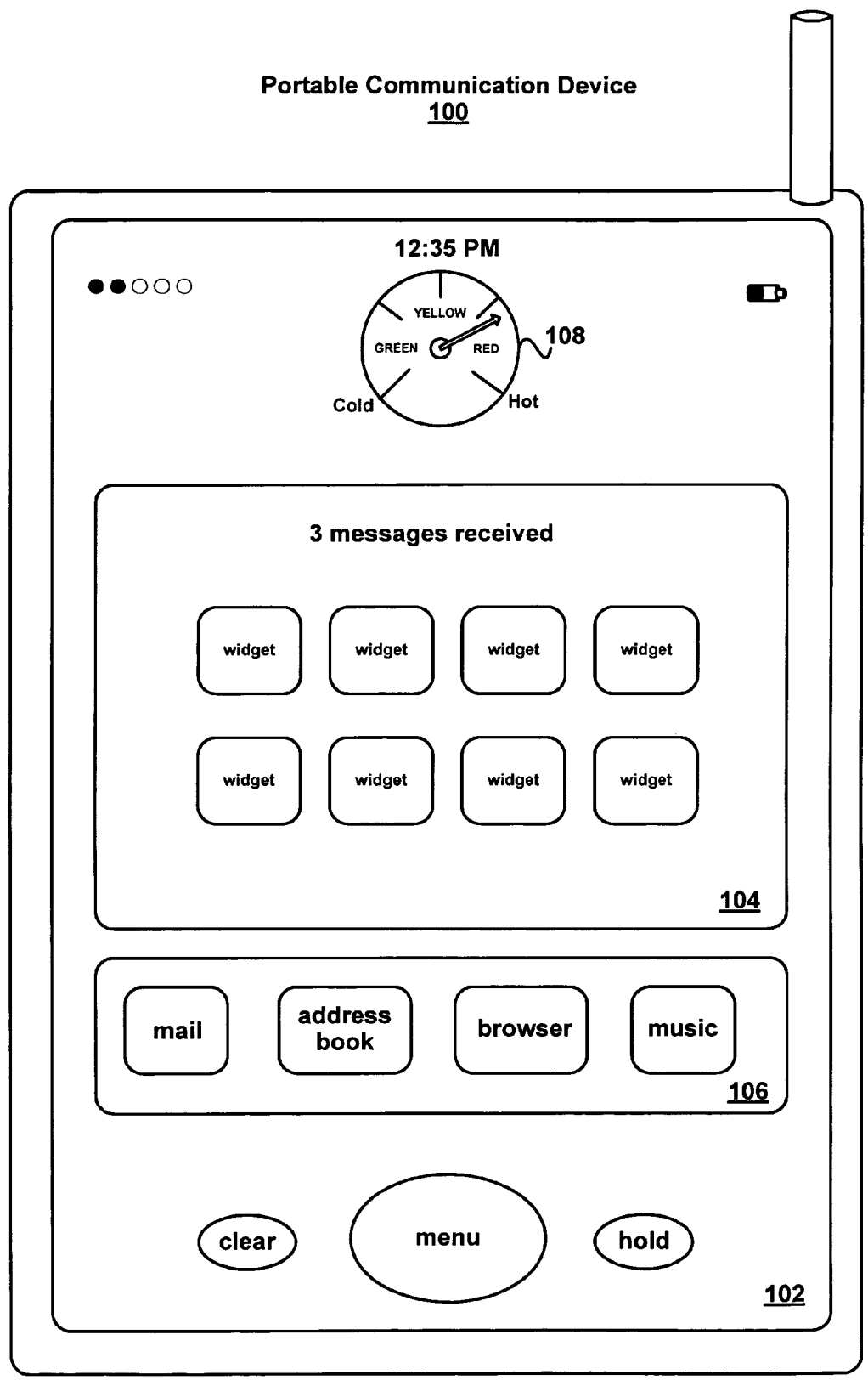
FIG. 1 is a schematic diagram of one embodiment of a portable communication device for displaying one or more account balances.

FIG. 1 is a schematic diagram of one embodiment of a portable communication device 100 for displaying one or more account balances. The device 100 includes a display surface/graphical user interface (GUI) 102 and one or more graphical objects 108 for displaying information associated with a service account. In some embodiments, the display surface 102 is a multi-touch sensitive display, analogous to the multi-touch sensitive touchpad described in U.S. Pat. No. 6,323,846, issued Nov. 27, 2001, entitled "Method and Apparatus for Integrating Manual Input," which is incorporated by reference herein in its entirety. In contrast to the touchpad in U.S. Pat. No. 6,323,846, the display surface 102 can be transparent to enable the user to see and interact with the graphical object 108.

In some embodiments, the GUI 102 includes a tray portion 106 and a window 104. The tray portion 106 holds graphical objects (icons, widgets, etc.) that represent frequently used applications (e.g., email, address book, browser, music, etc.). The window 104 can be used to store other graphical objects, Web pages or other data, and/or provide a mechanism for user input (e.g., via a virtual keyboard). The graphical object 108 is used to display information related to a service account, such as an account for providing voice and/or data services to the user of the device 100. In some embodiments, the graphical object 108 is downloaded from a network and presented in the GUI 102. In other embodiment, data and/or instructions for generating the graphical object 108 are stored locally in the device, but one or more parameter values for controlling the visual state of the object are downloaded from a network, and the resulting graphical object 108 is present in the GUI 102. In either case, the user can select the object 108 (e.g., by tapping on or near the object 108), which causes the object 108 to open at a default location in the GUI 102 (e.g., at the top of GUI 102).

In some embodiments, the graphical object 108 is an "analog" type meter (e.g., similar to a heat gauge) that includes an arrow that indicates (A) a remaining balance on an account, and/or (B) whether the user's resource usage rate (sometimes called the "burn rate") is less than, approximately equal to, or greater than an average resource usage rate associated with a predefined or user-selected budget for the account. The state of the graphical object 108 may indicate a prediction as to whether the user will prematurely exhaust the account prior to the expiration of an accounting time period. In some embodiments, as the user uses account resources (minutes, bandwidth, data storage capacity or any other asset or resource for which there is an account balance), the meter is automatically, without user action, updated to reflect the corresponding change in account status.

When the graphical object 108 indicates an account balance, the account balance metric will depend on the type of service account to which the subscriber has subscribed. As described below, some embodiments of the invention are consistent with multi-service accounts in which the user's resource budget (e.g., for a defined period of time, sometimes herein called an accounting period) is defined by a linear combination of resource usage amounts. For example, a particular account may provide a user with a combined monthly budget for voice and data transmission services, where transmission of N megabytes (MB) of data (e.g., 20 megabytes) is treated as equivalent to one minute of voice transmission usage. In another example, another account may provide a user with a combined monthly budget for voice transmission services, data transmission services, SMS messaging services, data storage services, and perhaps other services as well. In these embodiments, the service provider and/or the device may compute a "combined usage metric" indicative of the total resources used during an accounting period (e.g., a current or prior accounting period) as follows:

$$\text{usage\_metric} = \sum_i w_i \times (\text{usage of resource } i) \quad (1)$$

where i is an index having distinct values associated with two or more distinct resources, $w_i$ is a weight associated with resource i, and "usage of resource i" is a measurement of the amount of resource i used during the relevant accounting period. In some embodiments, the weights, $w_i$, may correspond to the monetary cost per unit of resource i used, and the combined usage metric may be a monetary value indicating either a total cost, or the amount of the user's budget that has been consumed. In some embodiments, the weights may be a function of the amount of resource usage during the accounting period. For instance, one or more of the weights may increase or decrease when the usage metric passes a threshold or budget amount. Alternately, individual weights may increase or decrease when the corresponding resource usage amount passes a threshold or budget amount.

The graphical object 108 can include one or more indicia which provide feedback to the user, such as "color zones" that indicate by color the account activity or balance. For example, the graphical object 108 can be a meter with multiple color coded zones. If the user's resource usage rate is high (compared with the average usage rate allowed by the user's account type or budget) or the account balance is low, then the arrow in the graphical object points to the color A (e.g., red) zone. Likewise, if the user's resource usage rate is low (compared with the average usage rate allowed by the user's account type or budget) or the account balance is high then the arrow points to the color C (e.g., green) zone. A color B (e.g., yellow) zone can indicate a moderate resource usage rate (compared with the average usage rate allowed by the user's account type or budget) or account balance. In some embodiments, the arrow itself can change colors to provide additional indicia of account status.

In some embodiments, the graphical object 108 provides a single metric for multiple services. For example, if a user has subscribed to both voice and data services, the individual metrics for each type of resource usage can be combined into a single resource usage metric. In some embodiments, the combined usage metric is computed using equation (1), shown above. However, in some other embodiments, it may be more useful for the metric used by the graphic object to indicate the remaining balance in the user's account for a current accounting period:

$$\text{object\_metric} = (\text{budget} - \text{usage\_metric})/nf, \quad (2)$$

where the combined usage metric, usage_metric, is as defined above in equation (1) and nf is a normalization factor. The scale factors used to compute the combined usage metric can be used to weight and/or convert the dimensions of the account balances. For example, if data transmission is measured in megabytes and voice transmission is measured in minutes, then the scale factors can convert the usage amounts into a common unit (e.g., dollars). In this example, $w_1$ (for voice transmission) and $w_2$ (for data transmission) can be $0.20/min and $0.01/MB, respectively. Optionally, the object_metric can be normalized by the normalization factor nf to fit within the range of the meter 108 using known normalization or linear scaling techniques. For instance, if the normalization factor is set equal to the budget, then the resulting universal_metric indicates the fraction of the budget that remains unused. If the normalization factor is set equal to 1, then the resulting universal_metric is equal to the user's remaining budget or account balance.

To obtain an object metric that is indicative of whether the user's resource usage rate is higher or lower than the average rage associated with an account budget or subscription plan, the following computation may be performed:

$$\text{usage\_rate\_metric} = 1 - ((\text{usage\_metric}/\text{usage\_period}) * (\text{budget\_period}/\text{budget})) \quad (3)$$

where the "budget" is the resource usage budget for a predefined accounting period, the "budget_period" is the number of days (or other time units) in the accounting period, and the usage_period is the number of days (or other time units) of the budget_period that have already expired. The usage_rate_metric is negative when the rate of resource usage exceeds the average usage rate allowed by the account budget or subscription plan, is equal to zero when the rate of resource usage exactly equals the average usage rate allowed by the account budget, and is positive when the rate of resource usage is less than the average usage rate allowed by the account budget.

The graphical object 108 can be presented in the GUI 102 automatically, on an ongoing basis and without user action. For instance, the graphic object 108 may be displayed whenever a main menu or navigation page is displayed, and whenever the device is actively using account resources, such as during a telephone call or data transfer. Alternately, the graphical object 108 can be activated by one or more taps by the user's fingers or a stylus. In some embodiments, the user can choose how to display graphical object 108, e.g., as part of specifying user preferences. The graphical object 108 can have attributes typically associated with graphical objects, such as the ability to be moved or resized anywhere in the GUI 102. The graphical object 108 can include various buttons or other mechanisms for minimizing, restoring and closing the object 108. The graphical object 108 can include text associated with one or more account balances, such as the actual number of minutes, megabytes or other resource units used or remaining. The graphical object can optionally include other text as well, such as text indicating an account type, account budget (e.g., monthly budget), or the like. Furthermore, the graphical object can optionally include color, fill patterns or the like, to convey additional account status (or resource usage) information.

The configuration of the portable device 100 shown in FIG. 1 is exemplary and other configurations are possible. For example, the graphical object 108 can be any type of object, such as a gauge, meter, dial, bar, graph, chart, animation, button, etc. In some embodiments, the user can be provided with a preference pane for selecting among a list of predefined meter types. Some additional examples of graphical objects 108 are shown in FIGS. 2A, 2B, 2C and 2D.

Figure 2A:
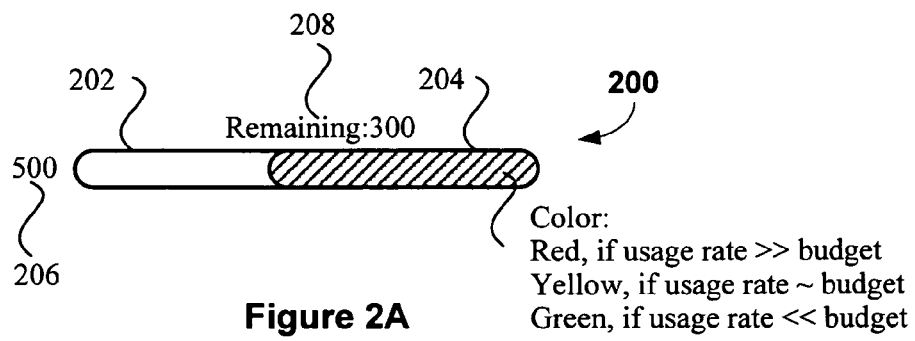
FIGS. 2A, 2B, 2C and 2D are illustrations of embodiments of meters for displaying account balances.
Figure 2B:
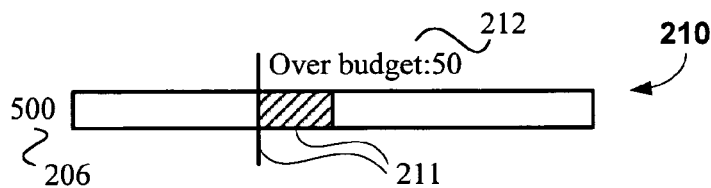

FIGS. 2A, 2B, 2C and 2D are illustrations of other embodiments of meters for displaying multiple account balances. FIG. 2A shows a horizontal bar meter 200, having a single horizontal bar 202 that is partially filled 204 to show how much of an account budget has been consumed and how much remains as the account balance. The horizontal bar meter 200 may be rectangular, or may have rounded edges, or may have other shape variations and/or embellishments. In some embodiments, the meter 200 includes text 206 indicating the account type or budget. The meter 200 may optionally include text 208 that indicates an account balance. The graphically displayed meter state, and the optional associated text (account budget 206 and/or account balance 208) may reflect an account balance (or usage amount) for a single type of resource (e.g., voice transmission minutes), or the meter and optional text may reflect an account balance (or usage amount) for two or more resources for which a combined balance or usage metric has been established. Multi-resource accounts and metrics are discussed above. FIG. 2B shows another horizontal bar meter 210 having a single horizontal bar, as well graphics 211 and/or text 212 for representing the amount by which an account budget has been exceeded.

Figure 2C:
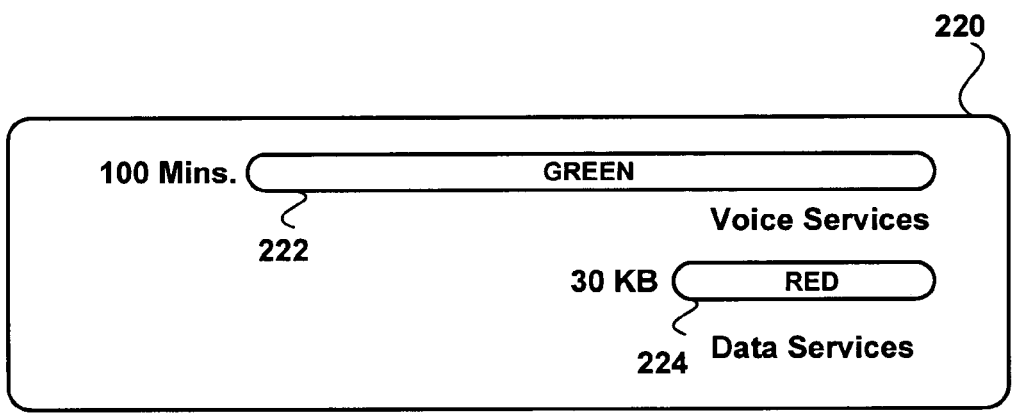

FIG. 2C shows a digital type meter 220 that includes one or more horizontal bars 222, 224, representing account balances. For example, the top bar 222 can display an account balance for voice services, such as the amount of monthly minutes remaining in a voice services account. The lower bar 224 can display an account balance for data services, such as the amount of monthly storage capacity remaining in a data services account. In some embodiments, the bars 222, 224, can be combined into a single bar displaying a universal unit for both services similar to the meter 108 shown in FIG. 1, or the meter shown in FIG. 2A. In some embodiments, the actual value of the account in appropriate units is displayed proximate to the bars 222, 224, to provide further account information.

Figure 2D:
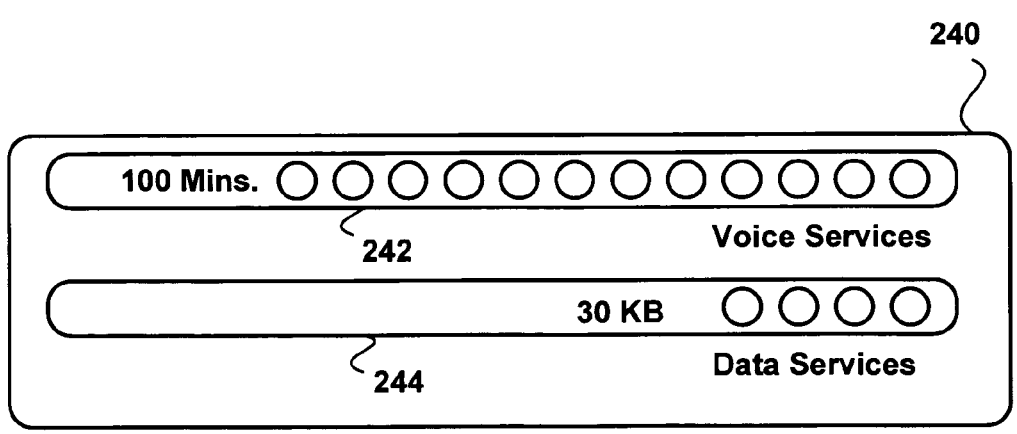

Another type of graphical object 240 is shown in FIG. 2D. The graphical object 240 in FIG. 2D replaces the bars 222, 224, in FIG. 2C with an array of segments 242, 244, that change color or fill pattern to show the remaining account balance or usage rate. For example, as the segments 242, 244 enter various balance or usage ranges, they can change colors from, for example, green to yellow to red. The segments 242, 244, can be any geometric shape, such as circles, squares, rectangles and the like.

Although the meters shown in FIGS. 2A-2D used horizontal bars, other orientations (e.g., vertical) and shapes (e.g., circles) may also be used.

Menu System Embodiment

Figure 3:
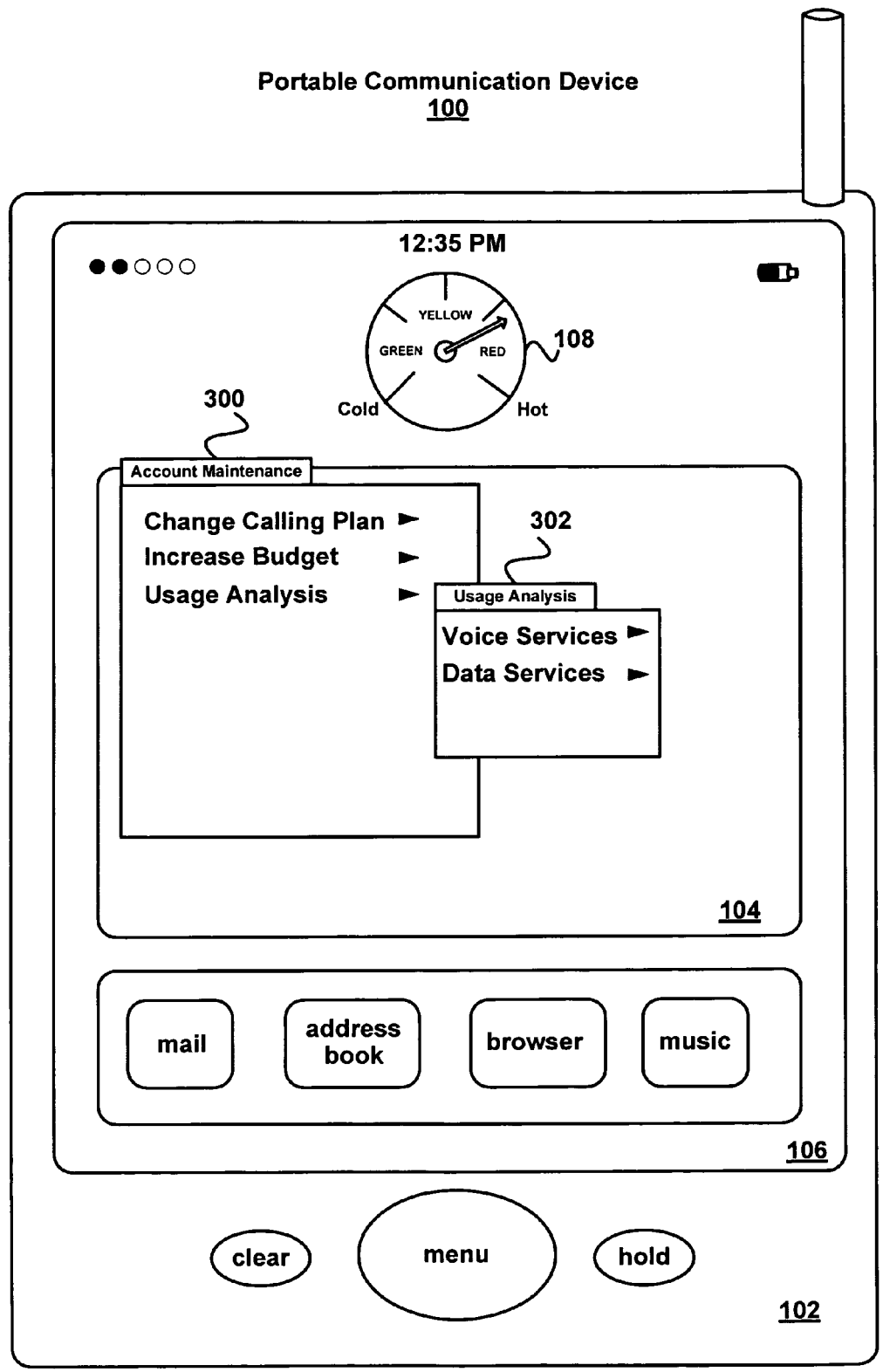
FIG. 3 is a an illustration of one embodiment of a user interface that includes a pull-down menu containing account-related actions.

FIG. 3 is a an illustration of one embodiment of the user interface 102 that includes a pull-down menu 300 containing account-related options. In some embodiments, the user can tap on the display surface 102 at or near the object 108, or on a designated hot spot or button to invoke the pull-down menu 300. The menu 300 can include several actions that can be selected by the user via touch input, including but not limited to changing a billing plan, increasing budget for a service account, and computing and/or displaying a detailed usage analyses. Each of these actions can result in a submenu 302 being presented to the user. For example, the usage analyses option might invoke a submenu 302 including options for voice services and data services.

The menus 300, 302 can include all the attributes typically associated with pull-down menus, such as "stickiness" and "highlighting." The menus 300, 302 can be part of a menu hierarchy having multiple layers depending upon the number and types of actions.

In some embodiments, the requested actions can be performed in the device 100. In other embodiments, the requested actions are fulfilled by a server computer on a network (e.g., a server on a wireless network). The server can be any device capable of connecting with the device 100 through a network and providing a service or data to the device 100. In some embodiments, other actions may result in a telephone call being initiated. For example, if a user selects a Change Calling Plan option then the device 100 can connect the user to a customer service representative who can then change the user's calling plan.

In some embodiments, there can be interaction with a network server that is transparent to the user of the portable communication device 100. For example, if the user selects Usage Analysis, then the device 100 can contact the service provider's network server and download data needed to perform the usage analysis. The device can then perform the analyses and display the results to the user. Alternatively, in some embodiments the server performs the usage analysis and sends only the results to the device 100 for display.

In some embodiments, a Web session is established with a Web page server that provides Web pages that enable the user to accomplish various tasks, such as requesting additional minutes or storage capacity, or conferring with technical support personnel or a customer service representative.

In some embodiments, certain trigger conditions can result in an action being performed by the device 100 alone or in combination with a network server. For example, the object 108 may automatically initiate certain actions when an account balance or resource usage rate reaches a threshold level. In some embodiments, when an account balance drops below a respective threshold value (e.g., determined by the user's account time, or determined by a user selection in a preference pane), then the menu 300 is automatically displayed and the user is prompted to make a selection. Alternately, or in addition, when a resource usage rate rises above a respective threshold value, the menu 300 is automatically displayed and the user is prompted to make a selection. In some embodiments, the device 100 generates an audio or visual message to indicate that a condition has been triggered, such as, for example, one or more tones, a music clip, a computer-generated announcement or a text message displayed in the window 104.

Account Update Process Flow

Figure 4:
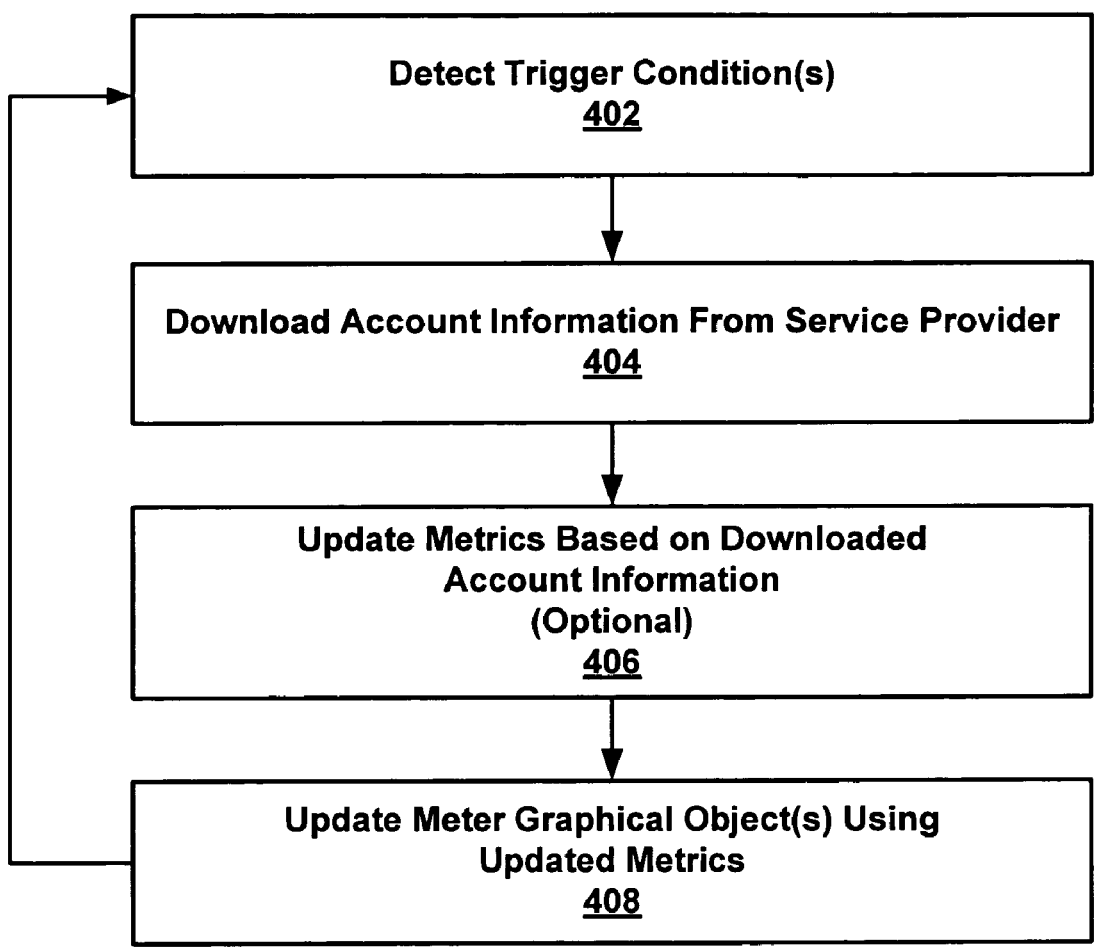
FIG. 4 is a flow diagram of one embodiment of an account update process flow.

FIG. 4 is a flow diagram of one embodiment of an account update process 400. While the parameter adjustment process 400 as described here includes a number of operations that appear to occur in a specific order, it should be apparent that the process can include more or fewer steps or operations, which can be executed serially or in parallel (e.g., using parallel processors or a multi-threading environment).

The process 400 begins by detecting (402) one or more trigger conditions. The trigger conditions can be automatically triggered by the portable communication device or by a service provider that is providing services to the user of the device. For example, a trigger condition can occur whenever a predefined amount of resource usage (e.g., one minute of voice transmission, 20 MB of data have been transmitted, etc.) has occurred. Alternately, or in addition, a trigger condition can occur when one or more account usage amounts, or usage rates, exceed a threshold set by default, by the service provider, or by the user, or when an account balance reaches or falls below a threshold. Another trigger condition can be the initiation of a connection between the device and the service provider, such as when the device is powered on or a connection is re-established after an interruption (i.e., a temporary loss of the connection). As noted, these trigger conditions can be detected by the device or by a service provider, depending on the implementation or embodiment. In some embodiments, another trigger condition can occur if the user manually selects a menu option (e.g., analyze device or service usage, change calling plans) or taps (or otherwise selects or signals) the usage meter. However, in other embodiments, all trigger conditions for updating usage metrics are automatic triggers that are outside the direct control of the user. In some embodiments, the trigger conditions occur periodically (e.g., every minute, 10 minutes, or hour) rather than episodically (e.g., in response to one of the predefined conditions described above).

After a trigger condition is detected the device downloads (404) account information from the service provider for the account. In some embodiments, the device establishes a secure network connection (e.g., SSL connectivity) with a service provider computer. The device can then send a message requesting the user's account information. The message can include identifying information (e.g., MSID) that can be used by the service provider to verify the device and the user. In some embodiments, the account information is sent in an encrypted format using a known cryptography scheme (e.g., symmetric key, elliptic curve, etc.) and must therefore be decrypted by the device before being processed.

The account information downloaded from the service provider is then used to update (406) one or more account metrics. For example, a universal metric can be updated as described above with respect to Equation 1, 2 and/or 3. In some embodiments, this operation is optional if the service provider performs the update and sends the updated metric to the device. After the metric is updated, the one or more graphical objects (and any associated text) are updated (408) to reflect the change in the one or more accounts. The updated graphic object is displayed on the device, thereby providing the user with updated account status information. For example, the arrow in the graphical object 108 shown in FIG. 1 (the heat gauge) can be adjusted as appropriate to reflect a resource usage rate or account balance.

The present invention can also be used when the account associated with a portable communication device is a multi-user account (also sometimes called a shared account or multi-device account), such as a "family plan" account that provides services to two or more portable communication devices. In such embodiments, the graphical object 108 may be configured to present the account balance and/or other account metric(s) for the entire multi-user account. The triggering condition(s) for updating the graphical object 108 for embodiments that utilize multi-user accounts may be detected by one or more service provider servers, with updated account information or metrics being sent in response to the trigger conditions to one or more of the portable communication devices that is participating in the multi-user account and that is currently powered on or otherwise capable of receiving the account information or metrics.

Portable Communication Device Architecture

Figure 5:
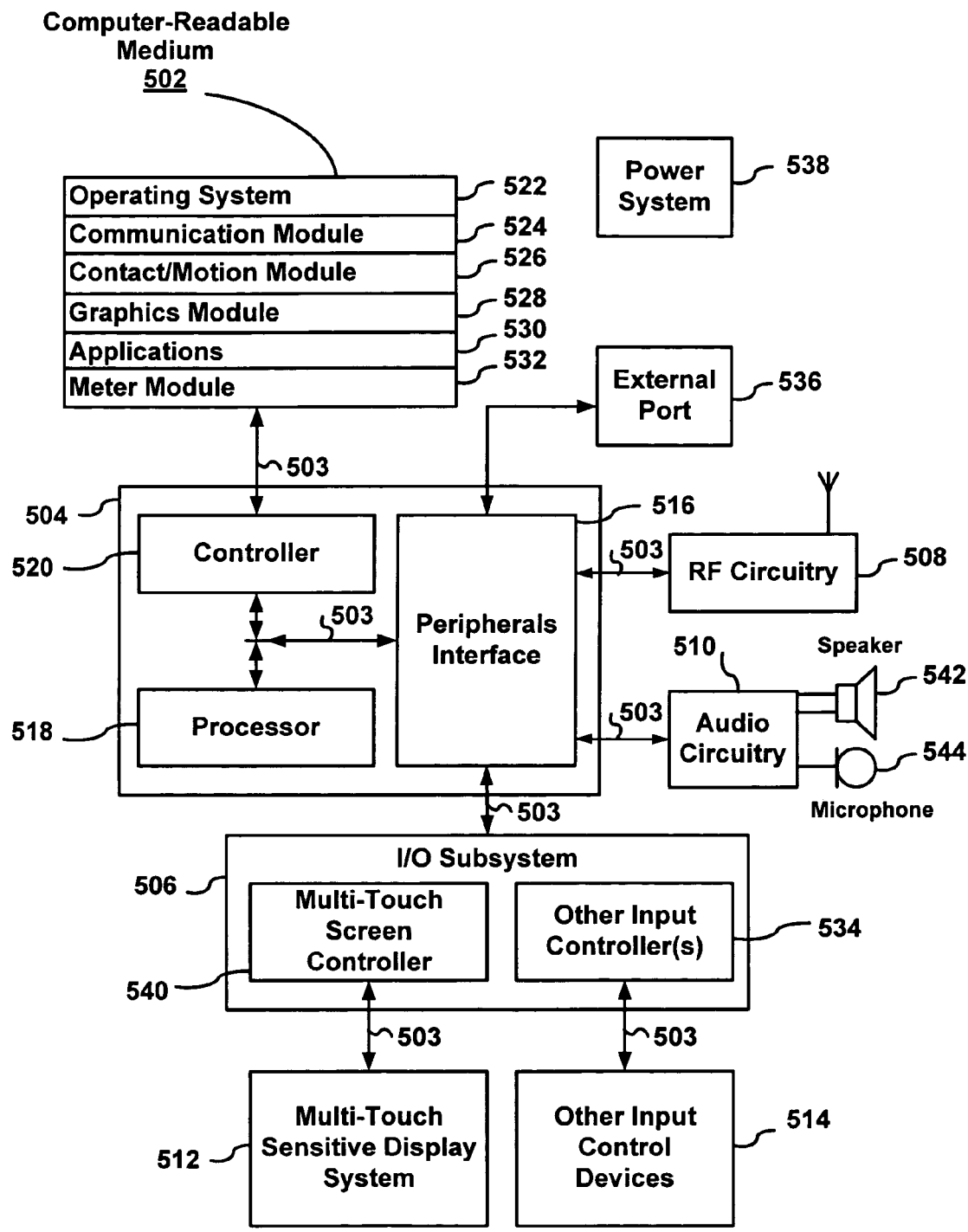
FIG. 5 is a block diagram of one embodiment of an architecture for the portable communication device shown in FIG. 1.

FIG. 5 is a block diagram of one embodiment of the internal architecture for the portable communication device 500 shown in FIG. 1. The portable communication device 500 generally includes one or more computer-readable mediums 502 (often called memory or storage devices), a processing system 504, an Input/Output (I/O) subsystem 506, radio frequency (RF) circuitry 508 and audio circuitry 510. These components communicate over one or more communication buses or signal lines 503, which may include a combination of data, address and control lines. The device 500 can be any portable communication device, including but not limited to a mobile telephone, a media player, a personal digital assistant (PDA) or the like.

It should be apparent that the architecture shown in FIG. 5 is only one example of an architecture for a portable communication device 500, and that the device 500 could have more or fewer components than shown, or a different configuration of components. The various components shown in FIG. 5 can be implemented in hardware, software or a combination of both hardware and software.

The RF circuitry 508 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 508 is capable of establishing and maintaining communications with other devices using one or more known RF communication protocols (e.g., TDMA, CDMA, etc.) and one or more known mobile networking protocols (e.g., GSM, ANSI-41, etc.). In other embodiments, the device 500 communicates with other devices over the Internet using Voice-Over-Internet Protocol (VoIP).

The RF circuitry 508 and the audio circuitry 510 are coupled to the processing system 504 via the peripherals interface 516. The interface 516 includes various known components for establishing and maintaining communication between peripherals and the processing system 504. The audio circuitry 510 is coupled to an audio speaker 542 and a microphone 544 and includes known circuitry for processing voice signals received from interface 516 to enable a user to communicate in real-time with other users. In some embodiments, the audio circuitry 510 includes a headphone jack (not shown). Voice and data information received by the RF circuitry 508 and the audio circuitry 510 (e.g., in speech recognition or voice command applications) is sent to one or more processors 518 via the interface 516. The one or more processors 518 are configurable to process various data formats for one or more applications 530.

Note that the term "data" includes but is not limited to text, graphics, Web pages, JAVA applets, emails, instant messages, voice, digital images or video, MP3s, etc., which can be used by one or more applications 530 (e.g., web browser, email client, telephone communication client, etc.) stored in medium 502. In some embodiments, the device 500 is capable of uploading and downloading various objects from the Internet over a wireless network or an external port 536, such as files, songs, digital images, videos, emails, instant messages, widgets (i.e., application programs), and the like.

The one or more processors 518 communicate with the one or more computer-readable mediums 502 via a controller 520, sometimes called a memory controller. The computer-readable medium 502 can be any device or medium that can store code and/or data for use by the one or more processors 518. The medium 502 can include a memory hierarchy, including but not limited to, cache, main memory and secondary memory. The memory hierarchy can be implemented using any combination of RAM (e.g., SRAM, DRAM, DDRAM), ROM, FLASH, magnetic and/or optical storage devices. In some embodiments, the medium 502 may further include storage remotely located from the one or more processors 518, for instance network attached storage accessed via the RF circuitry 508 or external port 536 and a communications network (not shown) such as the Internet, intranet(s), Local Area Networks (LANs), Wide Local Area Networks (WLANs), Storage Area Networks (SANs) and the like, or any suitable combination thereof.

The one or more processors 518 run various software components stored in the medium 502 to perform various functions for the device 500. In some embodiments, the software components include an operating system 522, a communication module 524, a contact/motion module 526, a graphics module 528, one or more applications 530 and a meter module 532.

The operating system 522 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 524 facilitates communication with other devices over one or more external ports 536 and the RF circuitry 508, includes various software components for handling the transmission and receipt of data via the RF circuitry 508 and/or the external port 536. The external port 536 (e.g., USB, FireWire™, etc.) is adapted for coupling directly to other devices or indirectly over a network (e.g., the Internet, wireless LAN, etc.).

The graphics module 528 includes various known software components for rendering, animating and displaying graphical objects in a GUI/display surface of the multi-touch sensitive display system 512. Note that the term "graphical object" includes any object that can be displayed to a user, including without limitation text, web pages, icons, digital images, animations and the like.

The one or more applications 530 can include any applications installed on the device 500, including without limitation, a browser, address book application, contact list application, email client, instant messaging client, word processing application, keyboard emulation application, widgets, JAVA-enabled applications, encryption application(s), digital rights management, etc.

The contact/motion module 526 includes various software components for performing various tasks associated with the multi-touch sensitive display system 512, such as receiving and processing multi-touch input from the user.

The meter module 532 includes various software components for performing the various tasks associated with the meter 108, as previously described with respect to FIGS. 1-4. In some embodiments, portions of the meter module 532 can be implemented in hardware.

The I/O subsystem 506 is coupled to the multi-touch sensitive display system 512 and, in some embodiments, one or more other physical control devices 514 (e.g., pushbuttons, switches, dials, LEDs, etc.) for controlling or performing various functions, such as power control, speaker volume control, ring tone loudness, keyboard input, scrolling, hold, menu, screen lock, clearing and ending communications and the like. The multi-touch sensitive display 512 communicates with the processing system 504 via a multi-touch sensitive screen controller 540 which includes various components for processing user input (e.g., scanning hardware).

The device 500 also includes a power system 538 for powering the various hardware components. The power system 538 can include a power management system, one or more power sources (e.g., battery, AC), a recharging system, a power failure detection circuit, a power converter or inverter, a power status indicator (e.g., LED or status indicator on the display 512) and any other components typically associated with the generation, management and distribution of power in portable devices.

The disclosed embodiments are not intended to be exhaustive or limited to the precise forms disclosed. Many modifications and variations to the disclosed embodiments are possible in view of the above teachings.

What is claimed is:

1. A portable communication device, comprising:
   a display configured to present a single combined usage metric as a meter that indicates whether a resource usage rate on the portable communication device is less than, approximately equal to, or greater than an average resource usage rate associated with an account budget for the portable communication device, wherein:
      the rate of resource usage is equal to an amount of resources used divided by a time period in which the resources were used, and
      the average resource usage rate is equal to a resource usage budget divided by a budget period; and
   a processor coupled to the display, wherein the processor is configured to automatically and repeatedly determine the single combined usage metric associated with usage of the portable communication device and to present the single combined usage metric on the display,
   wherein the single combined usage metric is a metric associated with a plurality of resources and the single combined usage metric is based on a combination of usage amounts of the plurality of resources.

2. The device of claim 1, further including a menu system configurable to display one or more actions associated with the single combined usage metric.

3. The device of claim 1, wherein the processor presents an updated combined usage metric on the display in response to a trigger condition.

4. The device of claim 1, wherein the meter includes colored zones that correspond to resource usage rates that are less than, approximately equal to, or greater than the average resource usage rate associated with the account budget.

5. The device of claim 4, wherein the colored zones include: a green zone for a user resource usage rate less than the average resource usage rate, a yellow zone for a user resource usage rate approximately equal to the average resource usage rate, and a red zone for a user resource usage greater than the average resource usage rate.

6. The device of claim 1, wherein the meter includes text labels, including a cold label for a user resource usage rate less than the average resource usage rate and a hot label for a user resource usage greater than the average resource usage rate.

7. The device of claim 1, wherein the account budget is a predefined budget.

8. The device of claim 1, wherein the account budget is a user-selected budget.

9. The device of claim 1, further comprising displaying a remaining account balance on the meter.

10. The device of claim 1, wherein the meter simulates an analog meter.

11. The device of claim 1, wherein the meter simulates a heat gauge.

12. A portable communication device, comprising:
a display configured to present a single combined usage metric as a meter that indicates whether a resource usage rate on the portable communication device is less than, approximately equal to, or greater than an average resource usage rate associated with an account budget for the portable communication device, wherein:
the rate of resource usage is equal to an amount of resources used divided by a time period in which the resources were used, and
the average resource usage rate is equal to a resource usage budget divided by a budget period; and
a processor, coupled to the display, and configured to automatically and repeatedly present the single combined usage metric for an account associated with usage of the portable communication device,
wherein the single combined usage metric is based on a combination of usage amounts of a plurality of resources.

13. The device of claim 12, wherein the display is a touch sensitive display.

14. The device of claim 12, wherein the meter is episodically updated by the portable communication device.

15. The device of claim 12, wherein the meter is updated in response to account information received from a computer associated with a service provider over a network connection.

16. The device of claim 12, wherein the meter is presented with related text on the display.

17. The device of claim 12, wherein the portable communication device includes a mobile telephone.

18. A method of displaying an account balance on a portable communication device, comprising:
in response to detection of a trigger condition, downloading account information from a service provider;
updating a single combined usage metric using the account information, wherein the single combined usage metric is based on a combination of usage amounts of a plurality of resources;
updating a graphical object based on the updated single combined usage metric; and
displaying the updated graphical object on the portable communication device as a meter that indicates whether a resource usage rate on the portable communication device is less than, approximately equal to, or greater than an average resource usage rate associated with an account budget for the portable communication device, wherein:
the rate of resource usage is equal to an amount of resources used divided by a time period in which the resources were used, and
the average resource usage rate is equal to a resource usage budget divided by a budget period.

19. The method of claim 18, further comprising:
automatically downloading account information based on a trigger condition occurring on the portable communication device.

20. The device of claim 18, wherein the plurality of resources includes at least two resources selected from the set consisting of telephone connection time, data transmission, data storage, and message sending and message receiving.

21. The method of claim 18, further comprising:
downloading account information in response to a manual request initiated by a user.

22. The method of claim 18, further comprising:
automatically displaying a menu in response to a trigger condition occurring.

23. A computer-readable medium having stored thereon instructions, which, when executed by a processor in a portable communication device, cause the processor to perform the operations of:
in response to detection of a trigger condition, downloading account information from a service provider;
updating a single combined usage metric using the account information, wherein the single combined usage metric is based on a combination of usage amounts of a plurality of resources;
updating a graphical object based on the updated single combined usage metric; and
displaying the updated graphical object on the portable communication device as a meter that indicates whether a resource usage rate on the portable communication device is less than, approximately equal to, or greater than an average resource usage rate associated with an account budget for the portable communication device, wherein:
the rate of resource usage is equal to an amount of resources used divided by a time period in which the resources were used, and
the average resource usage rate is equal to a resource usage budget divided by a budget period.

24. A portable communication device, comprising:
means for downloading account information from a service provider in response to detection of a trigger condition;
means for updating a single combined usage metric using the account information, wherein the single combined usage metric is based on a combination of usage amounts of a plurality of resources;
means for updating a graphical object based on the updated single combined usage metric; and
means for displaying the updated graphical object on the portable communication device as a meter that indicates whether the resource usage rate on the portable communication device is less than, approximately equal to, or greater than an average resource usage rate associated with an account budget for the portable communication devices wherein:

the rate of resource usage is equal to an amount of resources used divided by a time period in which the resources were used, and the average resource usage rate is equal to a resource usage budget divided by a budget period.

25. A graphical user interface on a portable communication device with memory and one or more processors to execute one or more programs stored in the memory, the graphical user interface comprising:

a graphical object that automatically and repeatedly displays an updated combined usage metric associated with usage of the portable communication device, wherein:

the updated combined usage metric is based on a combination of usage amounts of a plurality of resources, and the graphical object is displayed on the portable communication device as a meter that indicates whether a resource usage rate on the portable communication device is less than, approximately equal to, or greater than an average resource usage rate associated with an account budget for the portable communication device, wherein:

the rate of resource usage is equal to an amount of resources used divided by a time period in which the resources were used, and the average resource usage rate is equal to a resource usage budget divided by a budget period.

26. A portable communication device, comprising:

a display configured to present an updated account usage metric as a meter that indicates whether a rate of resource usage on the portable communication device is less than, approximately equal to, or greater than an average resource usage rate associated with an account budget for the portable communication device, wherein:

the rate of resource usage is equal to an amount of resources used divided by a time period in which the resources were used, and the average resource usage rate is equal to a resource usage budget divided by a budget period; and a processor coupled to the display, wherein the processor is configured to automatically and repeatedly present the updated account usage metric as the meter.

27. A portable communication device, comprising:

a display; and a processor coupled to the display, wherein the processor is configurable to:

calculate an allowed voice usage rate based on a total number of plan voice minutes and plan time period;

calculate an actual voice usage rate based on a number of minutes used during an elapsed time in the plan time period;

display a rate meter showing a first visual indication of the actual voice usage rate relative to the allowed voice usage rate if the actual voice usage rate is greater than the allowed voice usage rate; and display a rate meter showing a second visual indication of the actual voice usage rate relative to the allowed voice usage rate if the actual voice usage rate is less than the allowed voice usage rate, wherein the second visual indication is different from the first visual indication.

28. The portable communication device of claim 27, wherein the processor is further configurable to:

calculate an allowed data usage rate based on a total number of data units and a plan time period;

calculate an actual data usage rate based on a number of data units used during an elapsed time in the plan time period; and display a rate meter showing a third visual indication of the actual data usage rate relative to the allowed data usage rate if the actual data usage rate is greater than the allowed data usage rate; and display a rate meter showing a fourth visual indication of the actual data usage rate relative to the allowed data usage rate if the actual data usage rate is less than the allowed data usage rate, wherein the third visual indication is different from the fourth visual indication.

* * * * *

UNITED STATES PATENT AND TRADEMARK OFFICE
CERTIFICATE OF CORRECTION

PATENT NO. : 7,650,137 B2
APPLICATION NO. : 11/322552
DATED : January 19, 2010
INVENTOR(S) : Steven P. Jobs et al.

It is certified that error appears in the above-identified patent and that said Letters Patent is hereby corrected as shown below:

Title Page, Item (56), under "Other Publications", in column 2, line 1, delete "attel.com" and insert -- alltel.com --, therefor.

In column 2, line 23, delete "a an" and insert -- an --, therefor.

In column 6, line 16, delete "a an" and insert -- an --, therefor.

In column 12, line 67, in Claim 24, delete "devices" and insert -- device, --, therefor.

Signed and Sealed this
Twenty-ninth Day of November, 2011

David J. Kappos
*Director of the United States Patent and Trademark Office*